(12) United States Patent
Labonte et al.

(10) Patent No.: US 10,805,240 B2
(45) Date of Patent: Oct. 13, 2020

(54) SYSTEM AND METHOD OF PROCESSING NETWORK DATA

(71) Applicant: Arista Networks, Inc., Santa Clara, CA (US)

(72) Inventors: Francois Labonte, Menlo Park, CA (US); Hugh W. Holbrook, Palo Alto, CA (US)

(73) Assignee: Arista Networks, Inc., Santa Clara, CA (US)

( * ) Notice: Subject to any disclaimer, the term of this patent is extended or adjusted under 35 U.S.C. 154(b) by 40 days.

(21) Appl. No.: 16/147,201

(22) Filed: Sep. 28, 2018

(65) Prior Publication Data

US 2019/0104090 A1    Apr. 4, 2019

Related U.S. Application Data

(60) Provisional application No. 62/565,978, filed on Sep. 29, 2017.

(51) Int. Cl.
*H04L 12/935* (2013.01)
*H04L 12/947* (2013.01)
*H04L 12/851* (2013.01)

(52) U.S. Cl.
CPC ...... *H04L 49/3018* (2013.01); *H04L 47/2441* (2013.01); *H04L 49/252* (2013.01)

(58) Field of Classification Search
CPC . H04L 12/851; H04L 12/947; H04L 49/3018; H04L 47/2441; H04L 49/252
See application file for complete search history.

(56) References Cited

U.S. PATENT DOCUMENTS

| | | | |
|---|---|---|---|
| 8,130,768 B1 | 3/2012 | Ahrens et al. | |
| 8,259,585 B1 | 9/2012 | S P et al. | |
| 2003/0055552 A1 | 3/2003 | Akins et al. | |
| 2010/0115174 A1* | 5/2010 | Akyol | G06F 13/385 |
| | | | 710/316 |
| 2014/0269731 A1* | 9/2014 | DeCusatis | H04L 47/6275 |
| | | | 370/394 |
| 2015/0381507 A1 | 12/2015 | Masuda et al. | |
| 2019/0104089 A1 | 4/2019 | Labonte et al. | |

OTHER PUBLICATIONS

Fusun Ertemalp et al., "Using Dynamic Buffer Limiting to Protect Against Belligerent Flows in High-Speed Networks", IEEE, 2001, pp. 230-240.
U.S. Appl. No. 16/146,988, filed Sep. 28, 2018, Labonte.

* cited by examiner

*Primary Examiner* — Kyaw Z Soe
(74) *Attorney, Agent, or Firm* — Haley Guiliano LLP

(57) ABSTRACT

A method and apparatus of a network element that processes control plane data in a network element is described. In an exemplary embodiment, the network element receives network data and determines a class of the network data. The network element additionally determines that this class of the network data is to be processed. The network element further marks the network data based on at least on an existence of an indication of whether the network element had previously processed other data in the same class as the class of the network data. Furthermore, the network element queues the network data.

19 Claims, 10 Drawing Sheets

SYSTEM AND METHOD OF PROCESSING NETWORK DATA

RELATED APPLICATIONS

The present application claims the benefit of priority of prior, provisional application Ser. No. 62/565,978, filed Sep. 29, 2017, the entirety of which is hereby incorporated herein by reference.

FIELD OF INVENTION

This invention relates generally to data networking, and more particularly, to processing control plane data destined for the control plane.

BACKGROUND OF THE INVENTION

A network element (such as a router or switch) transmits and receives network data using one or more ports of that network element. Each port on the network element has a physical link speed that limits the rate at which network data can be transmitted from that port. The network element uses one or more queues to store the network data that is to be transmitted from one of the ports of the network element.

One type of network data that is transmitted from the one or more ports is control plane network data. This is network data that is to be transmitted to a control plane of the network element, and processed by a control plane processor. The control plane processor is responsible for configuring the network element, maintaining forwarding routes for the network element, and for performing other network element functions. Thus, proper and expedient processing of control plane network data is essential to the healthy functioning of a network element, as well as to the network to which the network element belongs.

Certain classes of control plane data packets are forwarded to the control plane, but only a single packet of this class of packets is required to be sent to the control plane for the service to be provided. If too many packets with the same request are sent to the control plane, these packets can crowd out other independent requests. For example, a route could be installed on a network element such that directly attached hosts are all reachable through an interface. The first time a packet is routed to a previously uninstalled destination address, the packet cannot be delivered because the router does not know the media access control (MAC) address of the next hop. The router needs to resolve the MAC address of the next hop through the address resolution protocol (ARP). The packet in question for this new destination cannot be delivered until the ARP is resolved, the specific route is determined, and the ARP re-write can be written into hardware data plane. In the meantime, the CPU could be getting a lot of packets destined for the same destination address that cannot all be queued or delivered, and as such, some or all of these packets will be dropped. The subsequent packets sent to the same destination are not necessary for the purpose of ARP resolution and it is desirable to avoid delivering them to the control plane.

SUMMARY OF THE DESCRIPTION

A method and apparatus of a network element that processes control plane data in a network element is described. In an exemplary embodiment, the network element receives control plane data and determines a class of the control plane data, wherein the control plane data is data that is processed by a control plane of the network element. In addition, the network element marks the control plane data based on at least on an existence of an indication of whether the network element had previously processed other data in the same class as the class of the control plane data. In one embodiment, the indication is when all of a first group of bits in a group of bitfields are set to a selected value. Furthermore, the network element queues the control plane data.

In a further embodiment, a method and apparatus of a network element that processes network data is described. In this embodiment, the network element receives the network data, wherein the network data is data that is processed by a network of the network element. In addition, the network element determines a class of the network data. Furthermore, the network element marks the network data based on at least on an existence of an indication of whether the network element had previously processed other data in the same class as the class of that network data. In one embodiment, the indication is when all of a first group of bits in a group of bitfields are set to a selected value. The network element additionally queues the network data.

Other methods and apparatuses are also described.

BRIEF DESCRIPTION OF THE DRAWINGS

The present invention is illustrated by way of example and not limitation in the Figures of the accompanying drawings in which like references indicate similar elements.

DETAILED DESCRIPTION

Figure 1:
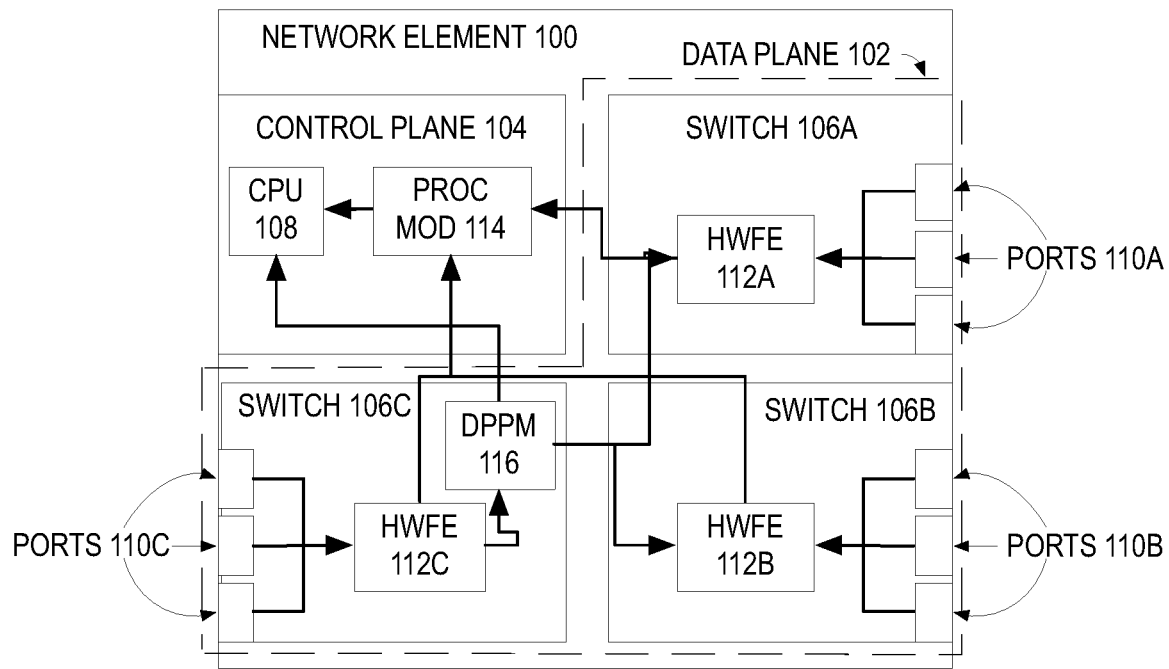
FIG. 1 is a block diagram of one embodiment of a network element that includes a control plane and a data plane, with the data plane communicating data to the control plane.

A method and apparatus of a network element that processes control plane data in a network element is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a network element that processes control plane data in a network element is described. In one embodiment, the network element processes control plane data such that the first packet in a class of control plane data is forwarded from a data plane of the network element to the control plane as a high priority packet. Subsequent packets of this control plane data class are forwarded to the control plane as low priority packets. In one embodiment, this is because for these types of packets, whether the control plane processes one, some, or all of the packets in this class, the same type of result occurs. For example and in one embodiment, an Internet Protocol (IP) v4 nexthop packet with the same characteristics (e.g., same nexthop, subnet pair) will result in the route being installed whether the control plane processes one or more of these packets.

In one embodiment, the network element classifies a control plane data packet that is received by the network element. With this classification, the network element determines a packet vector based on the characteristics of the packet and/or packet type. Using the packet vector, the network element determines if another packet in this class has been previously processed by the network element within a time period. In one embodiment, the network element determines whether another packet in this class has been previously been processed by computing a hash of the packet vector and determines if there is one or more bits set in a bitfield corresponding to the hash. In some embodiments, a bit is set if the bit has a high value (e.g., 1) and a bit is unset is the bit has a low value (e.g., 0). If the one or more bits are set, the network element has processed a previous packet in this class within a time period and the network element assigns a priority of the packet to low. If the one or more bits are unset, the network element has not processed a previous packet in this class within a time period and the network element assigns a priority of the packet to high. The network element can further set the bit in the bitfield. In addition, the network element queues the packet for processing by the CPU. In another embodiment, the network element computes multiple hashes, each different functions, on the same packet vector, and for each hash determines if there is a bit set in the bitfield to corresponding to that hash. If all bits are set the packet's priority is set to low, otherwise the packet's priority is assigned to a high value. The network element can further set the bit selected by the corresponding hash in each of the bitfields Thus, in one embodiment, setting the one or more bits for the bitfield to the same high value is an indication of whether the network element has processed a previous packet in this class within a time period. If these one or more bits have been set to the same high value (e.g., 1), the network element has processed a previous packet in this class within a time period and the packet can be assigned a low priority. Alternatively, if these one or more bits are not set to the same high value (e.g., one of the one or more bits is set to a low value, such as 0), the network element has not processed a previous packet in this class within a time period. Therefore, the existence or lack of existence of this indication can be used by the network element to determine whether to mark a packet with high or low priority. Alternatively, in one embodiment, the indication can be if the one or more bits all had another value (e.g., 0), or a predetermined pattern (for multiple bits). In one embodiment, if the one or more bits all had the value of zero, this can be an indication that the network element has processed a previous packet in this class within a time period. In a further embodiment, if there are multiple bits, the indication that the network element has processed a previous packet in this class within a time period can be if the multiple bits had a pre-determined pattern (e.g. 3 bits and the pattern is 101). In one embodiment, an administrator can select which pattern of bit values (e.g. all high, all low, or some other pre-determined bit value pattern) is to be used to determine as an indication of whether the network element has processed a previous packet of a class within a time period.

The network element can, in one embodiment, periodically clear one or more bits in the bitfield or set of bitfields. In this embodiment, the network element can set a timer for a bit. If the timer expires, the network element clears the bit corresponding to the timer.

FIG. 1 is a block diagram of one embodiment of a network element 100 that includes a control plane 104 and a data plane 102, with the data plane 102 communicating data to the control plane 104. In one embodiment, the data plane 102 receives, processes, and forwards network data using various configuration data (e.g. packet forwarding (routing, switching, or another type of packet forwarding), security, quality of service (QoS), and other network traffic processing information). For example, for each received packet of the network traffic, the data plane determines a destination address of that packet, looks up the requisite information for that destination in one or more tables stored in the data plane, and forwards the packet out the proper outgoing interface. The data plane 102 includes multiple switches 106A-C that can each receive, process, and/or forward network traffic. In one embodiment, each switch 106A-C includes a hardware forwarding engine 112A-C and ports 110A-C, respectively. In one embodiment, the network element 100 can be a switch, router, hub, bridge, gateway, etc., or any type of device that can communicate data packets with a network. In one embodiment, the network elements 100 can be a virtual machine.

In one embodiment, the control plane 104 includes central processing unit (CPU) 108 and processing module 114. As discussed herein, CPU 108 is interchangeably referred to as a control plane processor of network element 100. The CPU 108 is used to process information for the control plane 104 and write configuration data for hardware forwarding engines 112A-C in the network interface devices 106A-C. The information processed by CPU 108 includes, for example, control plane data corresponding to a plurality of different classes of control plane traffic, such as routing protocol messages, routing table messages, routing decisions messages, route update messages, unresolved traffic messages, L2 protocol messages, link aggregation control protocol messages, link layer state updates messages (e.g., spanning tree messages), link state update messages (e.g., link aggregation control protocol messages for a link aggregation group, bidirectional forwarding detection messages, etc.), exception packets that cannot be dealt with in hardware (e.g., router alerts, transmission time interval messages, maximum transmission size exceeded messages, etc.), program messages (e.g., packets from a controller instructing the programming of a network element), messages for routing table misses, time control messages (e.g., precision time protocol messages), messages marked as being of interest for snooping (e.g., access control list logging and port mirroring messages), messages used to collect traffic diagnostics, address resolution protocol (ARP) requests and replies, neighbor solicitation requests and replies, general communication to the control plane of the networking device, etc. CPU 108 processes the control plane network data to perform control management updates and/or respond with control message responses (e.g., routing decisions, protocol updates, traffic resolutions, etc.).

In one embodiment, the data plane 102 receives, processes, and forwards network data, including control plane network data, using various configuration data (e.g., forwarding, security, quality of service (QoS), and other network traffic processing information). The data plane 102 includes multiple switches 106A-C that can each receive, process, and/or forward network traffic. Each of the switches 106A-C includes multiple ports 110A-C that are used to receive and transmit network data.

In one embodiment, for each received unit of network data (e.g., a packet), the data plane 102 determines a destination address for the network data, looks up the requisite information for that destination in one or more tables stored in the data plane, and forwards the data out the proper outgoing interface, for example, one of the interface of switches 106A-C. In one embodiment, each switch 106A-C includes one or more hardware forwarding engines (HWFE(s)) 112A-C and ports 110A-C, respectively. Each hardware forwarding engine 112A-C forwards data for the network element 100, such as performing routing, switching, or other types of network forwarding.

In one embodiment, for each received unit of control plane data, the data plane 102 forwards the control plane network data to the CPU 108 (e.g., the control plane processor). In one embodiment, the control plane 104 gathers configuration data for the hardware forwarding engines 112A-C in control plane network data messages from different sources (e.g., locally stored configuration data, via a command line interface, or other management channel (e.g., SNMP (Simple Network Management Protocol), Simple Object Access Protocol (SOAP), Representational State Transfer type Application Programming Interface (RESTful API), Hypertext Transfer Protocol (HTTP), HTTP over Secure Sockets layer (HTTPs), Network Configuration Protocol (NetConf), Secure Shell (SSH), and/or another management protocol) and pushes this configuration data to the hardware forwarding engines 112A-C.

In one embodiment, to protect the efficient and healthy functioning of CPU 108, the control plane 104 includes the processing module 114. In this embodiment, the processing module 114 processes the control plane data from the switches 106A-C destined for the CPU 108. In this embodiment, the network element 100 sometimes require some packets to be sent to the CPU 108 to provide a service but in some cases, only a single packet of that type is required to be sent to the CPU 108 for the service to be provided. If too many packets with the same request are sent to the CPU 108, these packets can crowd out other independent requests. In one embodiment, processing packets for control plane policing introduces a method to provide a best effort culling of subsequent redundant requests such that independent requests can be processed equally.

For example and in one embodiment, on the network element 100, a route could be installed such that directly attached hosts are reachable through an interface. The first time a packet is routed to a previously uninstalled destination address, the packet cannot be delivered because the router does not know the media access control (MAC) address of the next hop. The router needs to resolve the MAC address of the next hop through the ARP resolution protocol. The packet in question for this new destination is dropped as will subsequent packets until the ARP is resolved and the specific route and ARP rewrite can be written in the hardware data plane. In the meantime, the CPU 108 could be getting a lot of packets destined for the same destination address that will all be dropped. In this example, these packets can be dropped in the hardware prior to getting to the CPU 108 to give the chance for other ARP packets for unresolved destinations to make it to the CPU 108 such that they can in turn be resolved.

Other examples of control plane classes of packets handled by the network element 100 that can be processed are routed packets requiring next hop resolution, ARP request for a certain destination IP address, ARP request from a certain source Mac address, IPv6 neighbor discovery packets, Access Control List (ACL) logging, Internet Control Message Protocol (ICMP) packets from a certain source IP address, and/or maximum transmission unit violations. The processing module 114 is further described in FIG. 2 below.

In one embodiment, switch 106C can include a data plane processing module 116 that processes network data received by the network element 100. The network data can be either control plane data, data plane data that is processed by the data plane 102, or a combination thereof. In one embodiment, the data processing module 116 is part of hardware forwarding engine 116C. In another embodiment, switches 106A-B can also include a data plane processing module (not illustrated), either as part of the hardware forwarding engines 116A-B or separate. Processing the network data is further described in FIG. 5 below.

Figure 2:
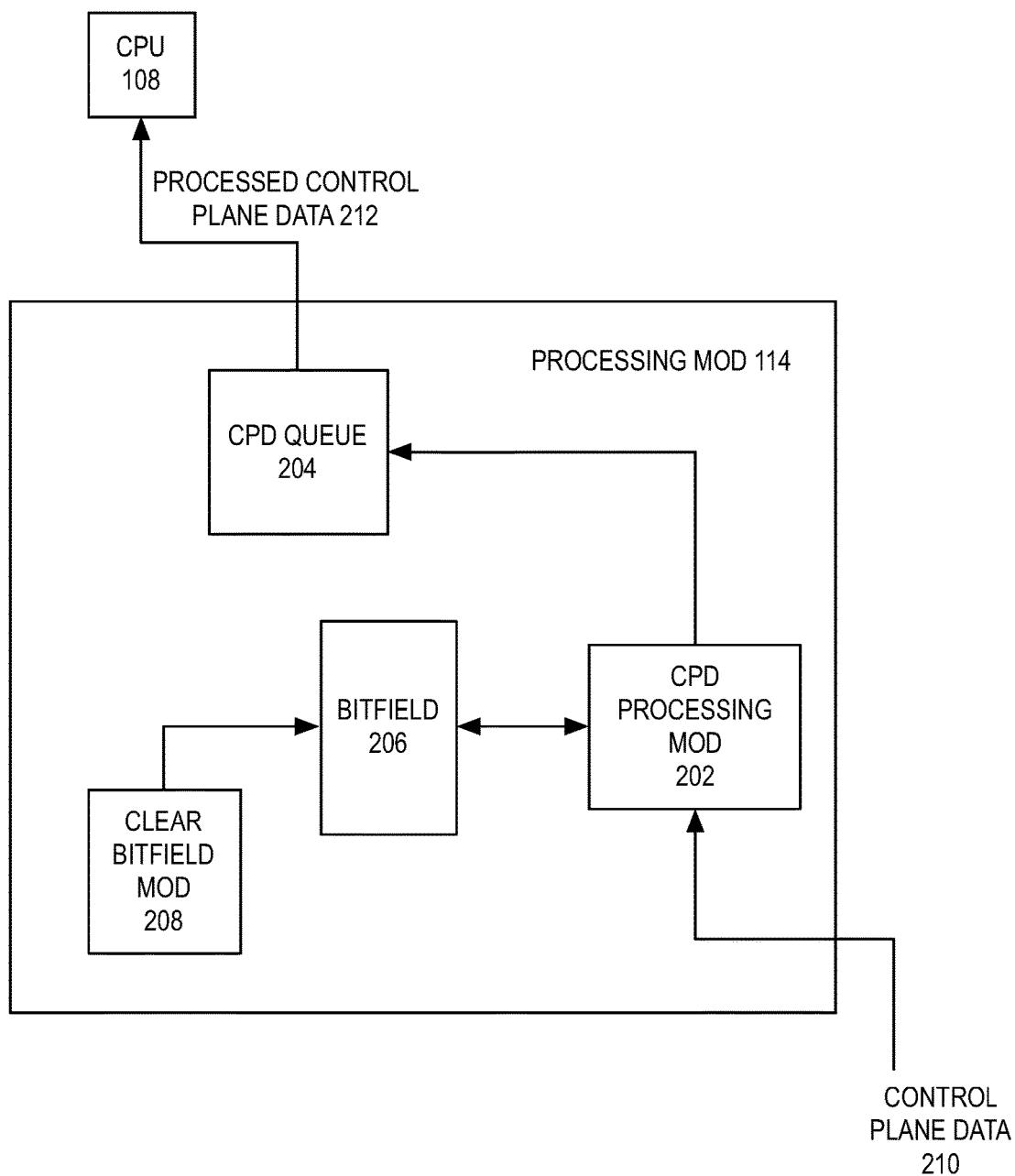
FIG. 2 is a block diagram of one embodiment of a processing module that processes control plane data to the central processing unit (CPU).

FIG. 2 is a block diagram of one embodiment of a processing module 114 that processes control plane data to the CPU 108. In FIG. 2, the processing module 114 includes a control plane data processing module 202, control plane data queue 204, bitfield 206, and clear bitfield module 208. In one embodiment, the processing module 114 receives control plane data 210 from the one or more hardware forwarding engines, processes this control plane data 210, and forwards the processed control plane data 212 to the CPU 108.

In one embodiment, the processing module 114 processes the control plane data by classifying the control plane data packet as part of a packet class, determining if another packet of this packet class have been processed by the processing module 114, marking the control plane data packet based on the determination, and queuing the marked control plane data packet in a control plane data queue 204. With this queued control plane data packet, the CPU 108 can process these queued control plane data packets based on the marking. In one embodiment, this queued control plane data packet is de-queued based on the determination.

In one embodiment, the processing module 114 includes the control plane data processing module 202, which maintains a bitfield 206 for the different classes of control plane data that is used to track whether a packet for this class has been processed (or recently processed) by the processing module 114. Alternatively, more than one bitfield can be used. In this embodiment, the control plane data processing module 202 classifies a control plane data packet, performs a lookup in the bitfield to determine if the control plane data processing module 202 has previously processed another packet in the same class as this current control plane data packet. If more than one bitfield is used, the control plane data processing module 202 performs a lookup in all of the bitfields to determine if it (202) has previously processed another packet in the same class as this current control plane data packet.

In one embodiment, the processing module 114 classifies each control plane data packet to determine a class for the packet. In one embodiment, a packet class is a set of packets that have the same or similar characteristics. In this embodiment, each packet in the packet class could have the same type of protocol data (e.g., same routing protocol), have the same source and/or destination address, have the same source and/or port, and/or some other type of characteristic. For example and in one embodiment, a packet class can be routed packets to a particular destination address and requiring next hop resolution, ARP requests for a certain destination IP address, ARP requests from a certain source Mac address, IPv6 neighbor discovery packets for a particular IPv6 neighbor, ACL logged packets from a particular flow, Internet Control Message Protocol (ICMP) packets from a certain source IP address, a packet that hits a route in a directly attached subnet where an ARP is not resolved, MTU violations on a particular interface, and/or other types of packet classes. In one embodiment, there are multiple packet classes for the same type of control plane data. For example and in one embodiment, there can be many different ARP request packet classes which are differentiated by the destination IP address requested. A packet type is a set of packets that are based on the protocol or function of the packet (e.g., ARP request, IPv6 neighbor discovery, ACL logging, control plane data, and/or other types of packets). A packet type is a broader classification of a packet than a packet class. In one embodiment, a packet class is a specific set of packets that share one or more packet characteristics (e.g., same source address, destination address, source port, destination port, protocol, other packet characteristics, and/ or a combination thereof) and a packet type. For example and in one embodiment, a packet type can be ARP requests and a packet class is ARP requests for an address X.Y.Z.W.

In another embodiment, a user can define criteria of which control plane packets are processed using the processing mechanism described in FIG. 3 below. In one embodiment, a user can designate a criterion that is used to select which packets are candidates for this type of processing. For example and in one embodiment, a user can designate a type of packet (e.g., BGP packets), a match of packet length, IP address (e.g., source of destination address, where the network element can hash one of the packet addresses), a subset of one or more packet characteristics, and/or a combination thereof. In one embodiment, the network element can use this criterion to process the data plane packet as described in FIG. 3 below.

For example and in one embodiment, for a received control plane data packet, the control plane data processing module 202 determines a packet type and constructs a vector of the unique characteristics of this packet for this type. In this example, if the control plane data packet is an unresolved IPv4 nexthop packet, the vector constructed would be the destination IP address and the virtual routing and forwarding (VRF) identifier. The control plane data processing module 202 performs a hash function on the vector that resolves the vector to n bits. The control plane data processing module 202 looks up the n bits the hash function in a bitfield that is $2^n$ bits wide. If the examined bit is not set, the control plane data processing module 202 gives the packet a high priority. Otherwise, if the bit examined is set, the control plane data processing module 202 gives the packet a low priority. The control plane data processing module 202 can send the marked packet to a queue, such as the control plane data queue 204. The high or low priority queueing for the packet can be performed in a variety of ways (e.g., a single queue with different drop thresholds, multiple queues with different scheduling properties, and/or other ways to queue packets with different priorities). The control plane data processing module 202 sets the examined bit of the bitfield so as to indicate that this class of packets has been processed. In one embodiment, the control plane data processing module 202 sets the bit by setting the value of the bit to 1. In another embodiment, instead of setting the bit upon the first appearance of a particular control plane data in a class of control plane data, the control plane data processing module 202 sets the bit non-deterministically. This allows the bit to be set, on average, after 10, 100, or more, packets in a class have been received. In this embodiment, the control plane data processing module 202 sets the bit using a probability function to determine whether to set the bit. For example and in one embodiment, a fixed threshold is chosen for each type of packet and the bit is set if a randomly selected value exceeds the threshold. In this embodiment the fixed value is chosen to select a desired fraction of the traffic (e.g. one in ten). Processing of the control plane data packets is further described in FIG. 3 below.

In one embodiment, the processing module 114 is effectively implementing a bloom filter for packets within a class to give low priority to packets when the processing module 114 has already seen a hash result of a packet vector (or a set of hash results in the case that multiple hash functions are used) for a packet. In another embodiment, hash collisions can happen in this scheme and, as such, a packet that is the first occurrence of a request within a class could be classified as low priority as a result of having been received after a packet with the same hash result since the bitfield was last cleared. In that case, the packet will have a lower priority than intended, but on a subsequent interval, the hash function may be changed to avoid having the same collision. In one embodiment, the hash function can hash the packet vector to 16 bits. Alternatively, the hash function can hash the packet vector to more or less bits.

In one embodiment, if the rate of packets for a certain class of packets is below a service rate that the CPU 108 can handle, the processing of the low priority packets would be the same or similar to the processing high priority packets. In this embodiment, the rate of the high and low priority is low enough that the CPU 108 can adequately process these packets without needing to delay or drop the low priority packets. In one embodiment, if the rate of these packets is above the service rate of CPU 108, the high priority packets will be preferentially processed by the CPU 108. In this embodiment, high priority packets are de-queued preferentially than the low priority packets. For example and in one embodiment, if queue 204 includes a queue for high priority packets and a queue for a low priority packets, the high priority packets can be more preferentially de-queued and processed by the CPU 108 as compared with the low priority packets. Alternatively, the queue is a single queue that has two different tail drop thresholds: a low drop threshold for packets that have their bitfield bit set either because a packet of the same class was seen before or through collision; and a high drop threshold for packets of classes that do not have the bitfield set. By having the low and high drop thresholds for this queue, packets that have been seen once have priority over packets seen more than once.

In one embodiment, the processing module 114 includes a clear bitfield module 208 that periodically clears a bit of the bitfield 206. In this embodiment, the clear bitfield module 208 clears a bit so as to reduce the likelihood for a collision, where packets from two different packet classes hash to the same set of bits. In one embodiment, the bits are cleared periodically to allow previously colliding flows to get back to a first seen high priority. In this embodiment, this is more simple and preferable in a world where one bitfield is shared among different classes.

In another embodiment, the bit is cleared when the packet has been serviced. For example and in one embodiment, for an unresolved ARP/neighbor discovery packet when the corresponding ARP/neighbor information has been received and installed, or for ACL logging when after the minimum amount of time between two logs for the same packet class (e.g., seconds). In this embodiment, this mechanism requires that the bit be set in the hardware once the packet has been successfully enqueued. Clearing a bit is further described in the FIG. 4 below.

Figure 3:
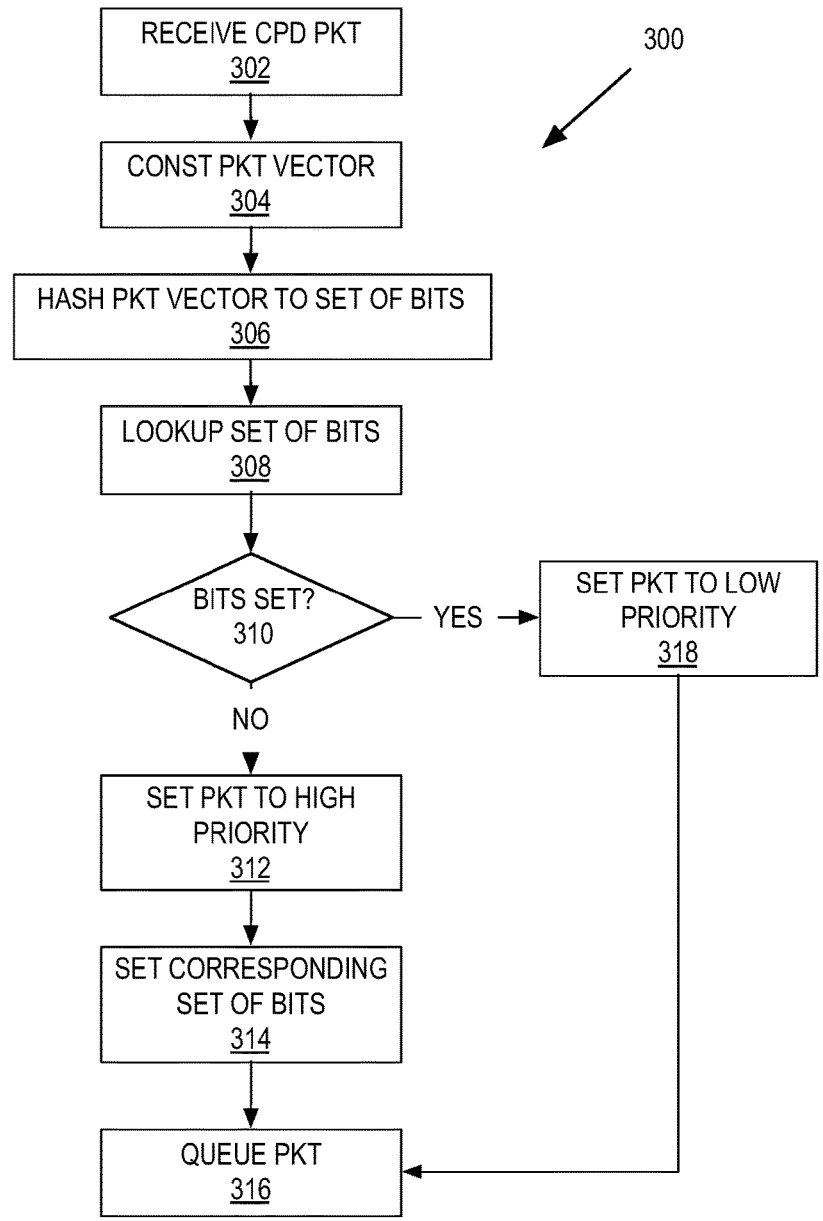
FIG. 3 is a flow diagram on one embodiment of a process to process control plane data.

FIG. 3 is a flow diagram on one embodiment of a process 300 to process control plane data. In one embodiment, a control plane data processing module processes the control plane data, such as the control plane data processing module 204 in FIG. 2 above. In FIG. 3, process 300 begins by receiving a control plane packet at block 302. In one embodiment, process 300 receives the control plane data from the one or more hardware forwarding engines of the one or more switches as described in FIG. 1 above. In addition, process 300 can classify the packet at block 302. In one embodiment, process 300 classifies the packet as described in FIG. 2 above. In one embodiment a packet type is determined for the packet in block 302. In one embodiment, the packet type is determined based on a subset of the packet characteristics. At block 304, process 300 constructs a packet vector for the packet. In one embodiment, the packet vector is a vector of packet characteristics determined by the type of packet determined in block 303. In this embodiment, packet characteristics can be one or more of the different characteristics of the packet, such as source IP address, destination IP address, source MAC address, destination MAC address, VRF identifier, Differentiated Services Code Point (DSCP), Protocol, traffic class, flow label, and/or other packet characteristics that can be part of the packet header and/or payload. In another embodiment, packet characteristics may also come from implicit attributes of the packet that are not part of the header or payload, such as the input port, input VLAN, input bridging domain, or input VRF. A packet characteristic may also be determined by prior processing done by the hardware forwarding engine or another element of the dataplane 102. In one embodiment, process 300 classifies the packet and selects which packet characteristics to use for the packet vector based on the packet classification. In one embodiment, process 300 selects different packet characteristics based on at least the packet type of the packet. For example and in one embodiment, if the packet is a control plane data packet that has a packet type of an unresolved IPv4 nexthop packet, the vector constructed would be the destination IP address and the virtual routing and forwarding (VRF) identifier. In another example, if the packet that has a packet type of ACL logging, the vector would be based on the type of ACL rule that was hit. In a further example, if the packet that has a packet type of a MTU violation to send an ICMP fragmentation, the packet vector can be the source interface. In one embodiment, the packet vector can be a tuple of one or more characteristics.

At block 306, process 300 hashes the packet vector to a set of Nbit values (or alternatively, a set of bits or group of bits) using one or more hash functions. In one embodiment, any type of hash function can be used to hash this packet vector. Alternatively, another type of function can be used to convert the packet vector to a value of the set of bits. Process 300 looks up each N-bit value in a corresponding member of a set of one or more bitfields that are each $2^N$ wide (e.g., each has a range of $2^N$ values) at block 308, producing a set of result bits. For example and in one embodiment, if 10 bits are used for a hash function, the range of possible values for the hashed packet vector is 1024 (e.g. 0 . . . 1023). In one embodiment, a different hash function or other function can be used to compute a different member of the set of values. In another embodiment, process 300 hashes the packet vector to a set of values, in which not all values have the same number of bits. In this embodiment, a value of length M bits is looked up in a bitfield that is $2^M$ bits wide.

At block 308, process 300 determines if the set of result bits looked up in block 306 was set. In one embodiment, each bit in the set of bitfields has two possible values (e.g., set/unset). If the set of result bits were all set, in one embodiment, this means that a packet with the same packet vector hash value was processed, within a certain time period, by process 300. Execution proceeds to block 318 below. Alternatively, if the set of bits were not all set, in one embodiment, this means that a same packet vector hash value was not previously processed, within a certain time period, by process 300. Execution proceeds to block 312 below.

At block 312, process 300 assigns a high priority to the packet. In one embodiment, by assigning the packet to high priority, the packet may get processed sooner than a low priority packet. In this embodiment, a high priority packet may get preferentially de-queued and processed sooner by the CPU than a lower priority packet. Process 300 sets a corresponding a set of bits in the set of bitfields corresponding to the packet vector of the packet at block 314. In one embodiment, the corresponding set of bits is the set of result bits that were result of the lookup at block 308. In another embodiment, process 300 sets the bits non-deterministically. In this embodiment, process 300 can use one or more probability functions to determine if any or all of the bits in the set of bits should be set. The probability function can be set with a particular weight or configuration so that a particular target rate can be approximated (e.g., 10 packets per second can be achieved when a bit is set after a certain number of packets in the class have been identified (e.g., 10 packets), and/or some other condition.) In a further embodiment, the probability function can use a threshold and a form of a random number generator (e.g., a random number generator, or pseudo-random number generator, and/or another type of random number generator). If the probability function result is above (or at or above) the threshold, one or more bits in the set of bits is set. Alternatively, process 300 can maintain a count and set one or more of the bits in the set of bits after N packets identified for a class (e.g., set one or more bits after 100 packets identified for this class of data). Execution proceeds to block 316 below. While in one embodiment, the assignment of the priority to the packet is based on whether the set of result bits are set, in another embodiment, another criterion can be used, in addition to whether the set of bits are set, to determine and assign a priority for the packet (e.g. a packet characteristic, a rule configured in the network element, and/or another criterion).

If the set of result bits that were looked up at block 308 were all set, process 300 assigns a low priority to the packet at block 318. In one embodiment, by assigning the packet to low priority, the packet may get processed later than a high priority packet. In this embodiment, a low priority packet may get un-preferentially de-queued and processed later by the CPU than a high priority packet. Execution proceeds to block 316 below. At block 316, process 300 queues the packet. In one embodiment, process 300 can select a queue based on at least the priority associated with the packet. For example and in one embodiment, if there are two queues, process 300 can queue a packet marked high priority in a queue for high priority packets and a packet marked low priority in a low priority packet queue. Alternatively, instead of selecting a queue, process 300 can select a queue threshold for the packet. In this embodiment, a high priority packet could have a queue threshold that is greater than a low priority packet. In one embodiment, the queue threshold is the threshold where packets can be dropped. For example and in one embodiment, a high priority packet can have a 100% queue threshold, while a low priority packet can have a queue threshold of 50%. In another embodiment, a packet that is determined to be low priority may be immediately dropped.

In one embodiment, the manner in which a packet is set for high or low priority can be handled in a variety of ways. For example and in one embodiment, a packet can be explicitly marked as high or low priority. Alternatively, a high/low priority packet can be explicitly marked and the other priority designation of packet is unmarked, where the priority of this type of packet if inferred. In a further embodiment, the packets are not explicitly marked, but the packets instead are queued in separate queues for high/low priority packets.

Figure 4:
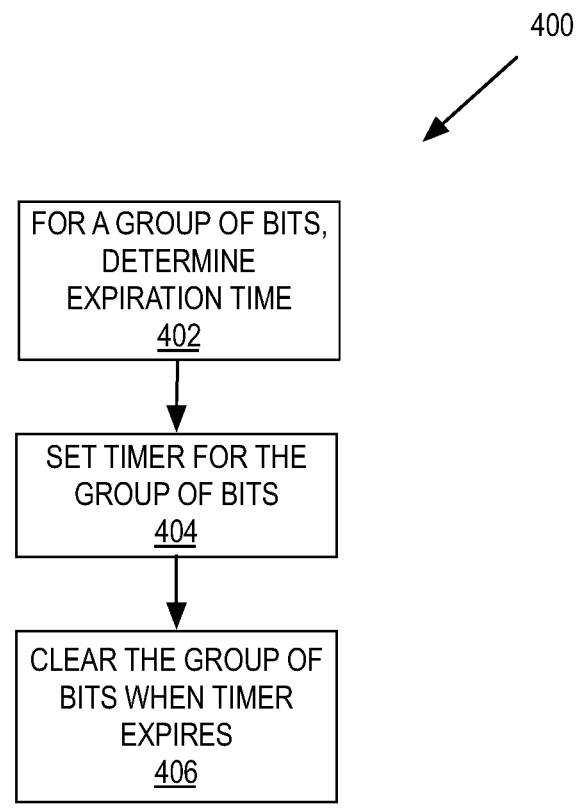
FIG. 4 is a flow diagram of one embodiment of a process to clear a bit in a filter.

In one embodiment, the processing module 114 includes a clear bitfield module 208 that periodically clears one or more bits in the bitfield 206. In one embodiment, clearing a group of bits in the set of bitfields reduces the impact of a collision, where packets from two different packet classes hash to the same set of bits. FIG. 4 is a flow diagram of one embodiment of a process 400 to clear a group of bits. In FIG. 4, process 400 begins by determining, for the group of bits, an expiration time. In one embodiment, the expiration time for the group of bits is determined based on the class of packets corresponding to that bitfield and the group of bits can be one, some, or all of the bits in the bitfield. For example and in one embodiment, if the class of packets corresponding to this bitfield is an ARP request from a device, the expiration time could be the round-trip time for the ARP request (or some multiple thereof) between the device and the network element. In another example, for an ACL logging packet, the expiration time can be how often the system wants to log an ACL. This could be on the order of seconds or configured by the user. In a further example, for a MTU violation to send an ICMP fragmentation packet, the expiration time can be the round trip time to the source. Alternatively, and in one embodiment, the group of bits could be cleared non-deterministically, such as by using a probability function (e.g., probability function with a weight and a threshold, using a random or pseudo-random number generator).

At block 404, process 400 starts a timer for a group of bits using the determined expiration time. Process 400 clears the group of bits when the timer expires at block 406. Alternatively, and in one embodiment, at the expiration of the timer, process 400 clears the group of bits non-deterministically, such using a probability function as described above. For example and in one embodiment, process 400 can compute a probability function with a threshold and if the result of the probability function is at or above (or just above) the threshold, process 400 clears the group of bits. In a further embodiment, process 400 can clear the bit deterministically by using a counter and a threshold.

As described above, control plane data can be processed. In one embodiment, a similar technique can be used to process network data that is received by the network element. In this embodiment, the network element examines the received packet to determine if this packet is part of a class of packets that are candidates for processing. Whether a packet is processed using the technique described below depends on whether the packet is part of one of the candidate classes. In this embodiment, a candidate class of packets is a set of packets defined by a user (or another type of management input) that determines which packets are subject this type of processing as described in FIG. 5 below. A candidate class can be a broad class of packets (e.g., ARP packets, BGP packets, or other broad class of packets) or can be a narrow class of packets (e.g., packet from or destined to a particular subnet, packets with a certain source or destination port, or another narrow class of packets), and/or a combination thereof. If a packet is part of one the defined candidate classes, the packet can be subjected to the processing as described in FIG. 5 below. In one embodiment, a candidate class can be the same or different than a packet class described above.

In one embodiment, because the data plane processes data that is to be forwarded and/or processed by the network element (including data processed by the control plane), not all of the packet classes need to be processed. For example and in one embodiment, a flow of packets for a packet class that are associated with a web session does not need to be processed, as each of the packets are likely to be needed to handle the web session. Thus, this flow of packet would not fall in a candidate class. Similarly, a flow of packets for an audio/video session (e.g., streaming music or video) does not need to be processed and is not part of a candidate class, because each of the packets is used in the audio/video session. Alternatively, and in one embodiment, packet flows that include redundant packets can be candidates for processing, if this is defined by the user. For example and in one embodiment, an ARP request storm can be created by a malicious user. In this example and embodiment, the network element processes these types of packets classes that are associated with the ARP request storm as described below. As another example and embodiment, packet classes associated with a broadcast storm can be processed as described below. In a further embodiment, the packet class can be a class of network data designated by the user using a one or more criterion.

In another embodiment, a user can define criteria of which packets are processed using the processing mechanism described in FIG. 5 below. In one embodiment, a user can designate a criterion that is used to determine what packet candidates are used for this type of processing. For example and in one embodiment, a user can designate a type of packet (e.g., BGP packets), a match of packet length, IP address (e.g., source of destination address, where the network element can hash one of the packet addresses), a subset of one or more packet characteristics, and/or a combination thereof. In one embodiment, the network element can use this criterion to process the data plane packet as described in FIG. 5 below.

Figure 5:
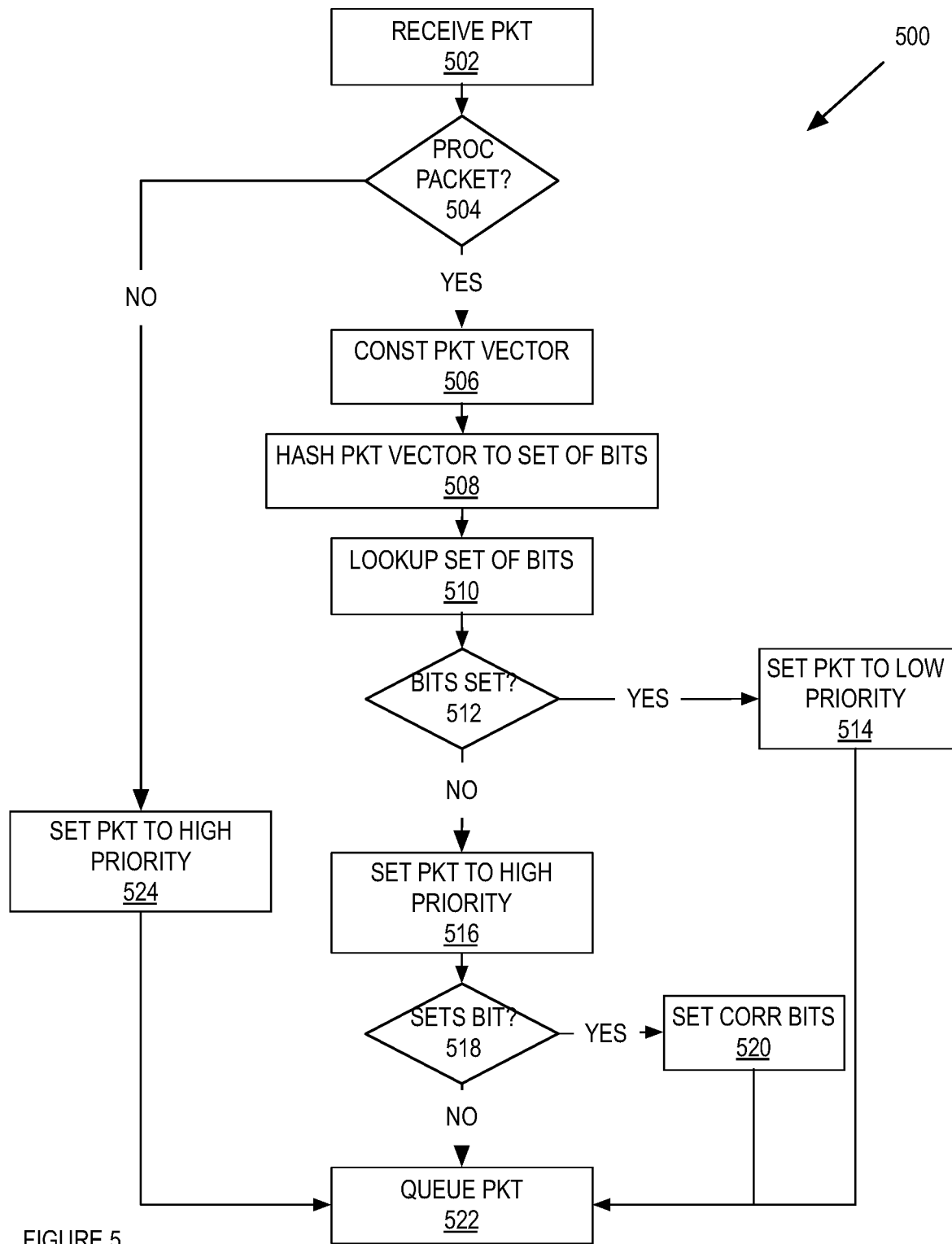
FIG. 5 is a flow diagram of one embodiment of a process to process network data.

FIG. 5 is a flow diagram on one embodiment of a process 500 to process network data. In one embodiment, a data plane process module processes the network data, such as the data plane process module 114 described in FIG. 1 above. In FIG. 5, process 500 begins by receiving a network data at block 502. In one embodiment, process 500 receives the network data packet from the one or more hardware forwarding engines of the one or more switches as described in FIG. 1 above. Process 500 determine if the packet is a part of candidate class for processing at block 504. In one embodiment, process 500 determines if the packet is a candidate for processing by classifying the packet to determine if the packet belongs to one of the candidate classes that are defined by a user for processing. In one embodiment, a user can set one or more criteria for what packets classes are candidates for processing.

As described above, not all packet classes are processed by process 500. If the packet is to be processed, execution proceeds to block 506 below. If the packet is not to be processed, execution proceeds to block 524, where process 500 marks the packet as high. In one embodiment, process 500 marks the packet as high priority as described in block 516 below.

At block 506, the packet is to be processed and process 500 constructs a packet vector for the packet. In one embodiment, the packet vector is a vector of packet characteristics used to identify the type of packet that process 500 received. In this embodiment, packet characteristics can be one or more of the different characteristics of the packet, such as source IP address, destination IP address, source MAC address, destination MAC address, VRF identifier, Differentiated Services Code Point (DSCP), Protocol, traffic class, flow label, and/or other packet characteristics that can be part of the packet header and/or payload. In another embodiment, packet characteristics may also come from implicit attributes of the packet that are not part of the header or payload, such as the input port, input VLAN, input bridging domain, or input VRF. A packet characteristic may also be determined by prior processing done by the hardware forwarding engine or another element of the dataplane. In one embodiment, process 500 determines the packet type and selects which packet characteristics to use for the packet vector based on the packet type. In one embodiment, process 500 selects different packet characteristics based on at least the packet type of the packet. For example and in one embodiment, if the packet is a control plane data packet that has a packet type of an unresolved IPv4 nexthop packet, the vector constructed would be the destination IP address and the virtual routing and forwarding (VRF) identifier. In another example, if the packet that has a packet type of ACL logging, the vector would be based on the type of ACL rule that was hit. In a further example, if the packet that has a packet type of a MTU violation to send an ICMP fragmentation, the packet vector could be the incoming interface. In one embodiment, the packet vector can be a tuple of one or more characteristics.

At block 508, process 500 hashes the packet vector to a set of Nbit values (or alternatively, set of bits or group of bits) using one or more hash functions. In one embodiment, any type of hash function can be used to hash this packet vector. Alternatively, another type of function can be used to convert the packet vector to a value of a set of bits. Process 500 looks up each N-bit value in a corresponding member of a set of one or more bitfields that are each $2^N$ wide (e.g., each has a range of $2^N$ values) at block 510, producing a set of result bits. For example and in one embodiment, if 3 bits are used for the one or more hash functions, the range of possible values for the hashed packet vector is 8 (e.g. 0 . . . 7). In one embodiment, a different hash function or other function can be used to compute a different bit in the set of bits. In another embodiment, process 500 hashes the packet vector to a set of values, in which not all values have the same number of bits. In this embodiment, a value of length M bits is looked up in a bitfield that is $2^M$ bits wide.

At block 512, process 500 determines if the set of result bits looked up in block 306 were set. In one embodiment, each bit is the set of bitfields has two possible values (e.g., set/unset). If the set of result bits were all set, in one embodiment, this means that a packet with the same packet vector hash value was processed, within a certain time period, by process 500. Execution proceeds to block 514 below. Alternatively, if the set of bits are not set, in one embodiment, this means that a same packet vector hash value was not previously processed, within a certain time period, by process 500. Execution proceeds to block 518 below.

At block 516, process 500 assigns a high priority to the packet. In one embodiment, by assigning the packet to high priority, the packet may get processed sooner than a low priority packet. In this embodiment, a high priority packet may get preferentially de-queued and processed sooner by the CPU than a lower priority packet. At block 518, process 500 determines if the set of bits in a set of one or more bitfields should be set. In one embodiment, the first appearance of a packet in a packet class triggers the setting of the set of bits. In another embodiment, instead setting the set of bits upon the first appearance of a particular network data in a class of network data, process 500 sets this set of bits non-deterministically. This allows the set of bits to be set, on average, 10, 100, or greater packets per second. In this embodiment, process 500 sets the set of bits using a probability function to determine whether to set the set of bits. For example and in one embodiment, a probability function can be used with a particular weight for a given result (e.g. 10 packets per second). In another embodiment, process 500 sets the bit non-deterministically. In this embodiment, process 500 can use a probability functions to determine if any or all of the bits in the set of bits should be set. The probability function can be set with a particular weight or configuration so that a particular characteristic can be achieved (e.g., 10 packets per second can be achieved, bit is set after a certain number of packets in the class have been identified (e.g., 10 packets), and/or some other condition.) In a further embodiment, the probability function can use a threshold and a form of a random number generator (e.g., a random number generator, or pseudo-random number generator, and/or another type of random number generator). If the probability function result is above (or at or above) the threshold, one or more bits in the set of bits is set. Alternatively, process 500 can maintain a count and set one or more of the bits in the set of the set of bits after N packets identified for a class (e.g., set one or more bits after 100 packets identified for this class of data). If process 500 determines that bits are to be set, execution proceeds to block 520 below. If the set of bits is not to be set, execution proceeds to block 522 below.

Process 500 sets a corresponding set of bits in the set of bitfields corresponding to the packet vector of the packet at block 520. In one embodiment, the corresponding set of bits is the set of result bits that was result of the lookup at block 510. If the set of bits that was looked up at block 512 were set, process 500 assigns a low priority to the packet at block 514. In one embodiment, by assigning the packet to low priority, the packet may get processed later than a high priority packet. In this embodiment, a low priority packet may get un-preferentially de-queued and processed later by the CPU than a high priority packet. Execution proceeds to block 522 below. At block 522, process 500 queues the packet. In one embodiment, process 500 can select a queue based on at least the priority mark associated with the packet. For example and in one embodiment, if there are two queues, process 500 can queue a packet marked high in a queue for high marked packets and a packet marked low in a low marked packet queue. Alternatively, instead of selecting a queue, process 500 can select a queue threshold for the packet. In this embodiment, a high marked packet could have a queue threshold that is greater than a low marked packet. In one embodiment, the queue threshold is the threshold where packets can be dropped. For example and in one embodiment, a high marked packet can have a 100% queue threshold, while a low marked packet can have a queue threshold of 50%.

Figure 6:
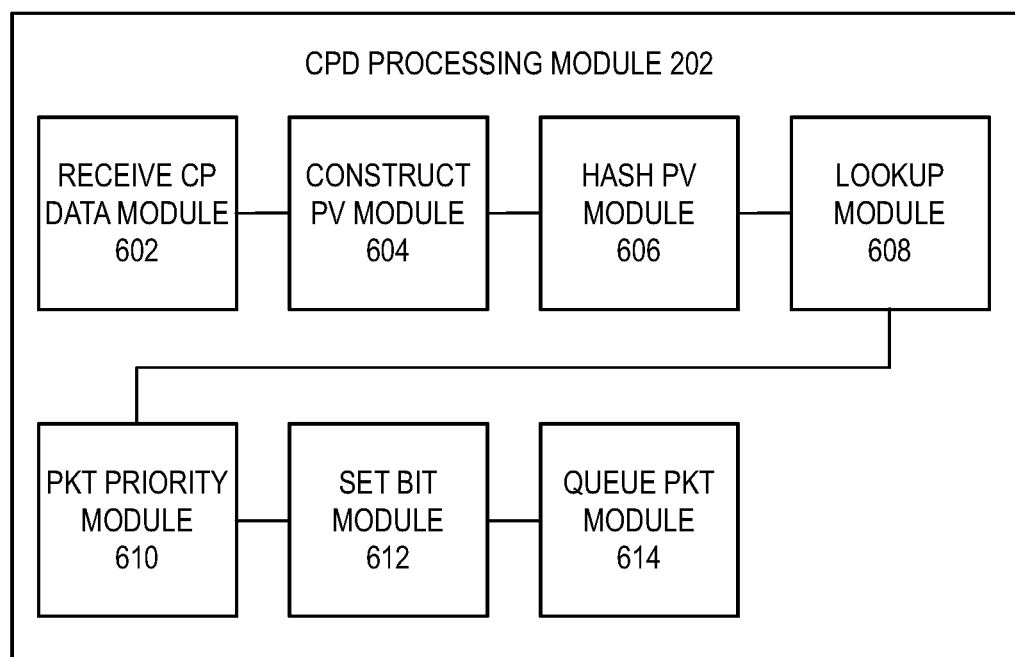
FIG. 6 is a block diagram of one embodiment of a control plane data processing module that processes control plane data to the CPU.

FIG. 6 is a block diagram of one embodiment of a control plane data processing module 202 that processes control plane data to the CPU. In one embodiment, the control plane data processing module 202 includes a receive control plane data packet module 602, construct packet vector module 604, hash packet vector module 606, lookup module 608, packet priority module 610, set bit module 612, and queue packet module 614. In one embodiment, the receive control plane data packet module 602 receives the control plane data packet as described in FIG. 3, block 302 above. The construct packet vector module 604 constructs the packet vector as described in FIG. 3, block 304 above. The hash packet vector module 606 hashes the packet vector as described in FIG. 3, block 306 above. The lookup module 608 looks up the hashed packet vector in a set of bitfields as described in FIG. 3, block 308 above. The packet priority module 610 assigns the packet priority as described in FIG. 3, blocks 312 and 318 above. The set bit module 612 sets the set of bits in the bitfield as described in FIG. 3, block 314 above. The queue packet module 614 queues the packet as described in FIG. 3, block 316 above.

Figure 7:
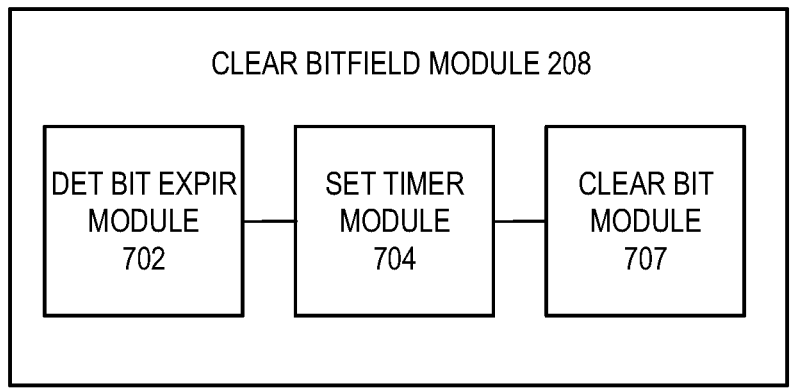
FIG. 7 is a block diagram of one embodiment of a clear bitfield module that clears a bit in a filter.

FIG. 7 is a block diagram of one embodiment of a clear bitfield module 208 that clears a bit in a process. In one embodiment, the clear bitfield module 208 includes a determine bit expiration module 702, set timer module 704, and clear bit module 706. In one embodiment, the determine bit expiration module 702 determine the expiration time for a set of bits as described in FIG. 4, block 402. The set timer module 704 sets the expiration timer as described in FIG. 4, block 404. The clear bit module 706 clears the set of bits as described in FIG. 4, block 406.

Figure 8:
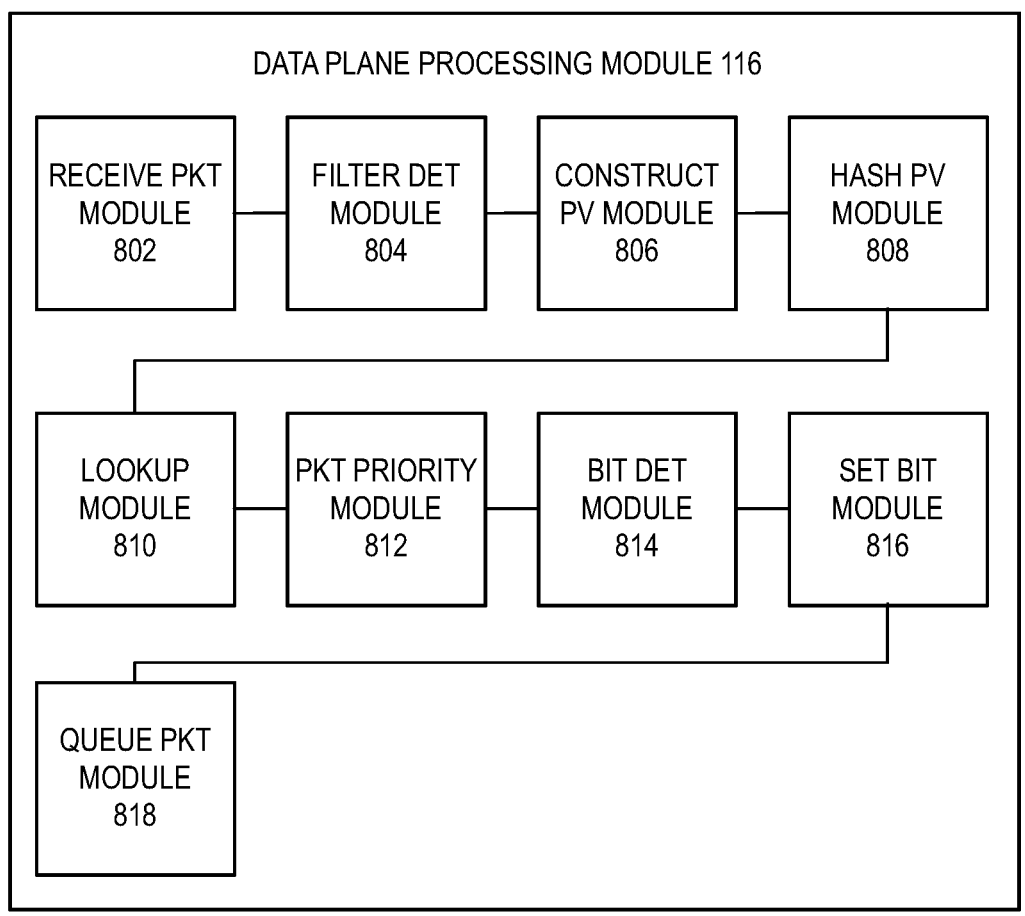
FIG. 8 is a block diagram of one embodiment of a data plane processing module that processes network data.

FIG. 8 is a block diagram of one embodiment of a data plane processing module 116 that processes network data. In one embodiment, the data plane processing module 116 includes a receive packet module 802, process determination module 804, construct packet vector module 806, hash packet vector module 808, lookup module 810, packet priority module 812, bit determination module 814, set bit module 816, and queue packet module 818. In one embodiment, the receive packet module 802 receives the packet as described in FIG. 5, block 502 above. The process determination module 804 determines whether to process the packet as described in FIG. 5, block 504 above. The construct packet vector module 806 constructs the packet vector as described in FIG. 5, block 506 above. The hash packet vector module 808 hashes the packet vector as described in FIG. 5, block 508 above. The lookup module 810 looks up the hashed packet vector in a set of bitfields as described in FIG. 5, block 510 above. The packet priority module 812 assigns the packet priority as described in FIG. 5, blocks 514, 516, and 524 above. The bit determination module 814 determines if to set the set of bits as described in FIG. 5, block 518 above. The set bit module 816 sets the set of bit in the set of bitfields as described in FIG. 5, block 520 above. The queue packet module 818 queues the packet as described in FIG. 5, block 522 above.

Figure 9:
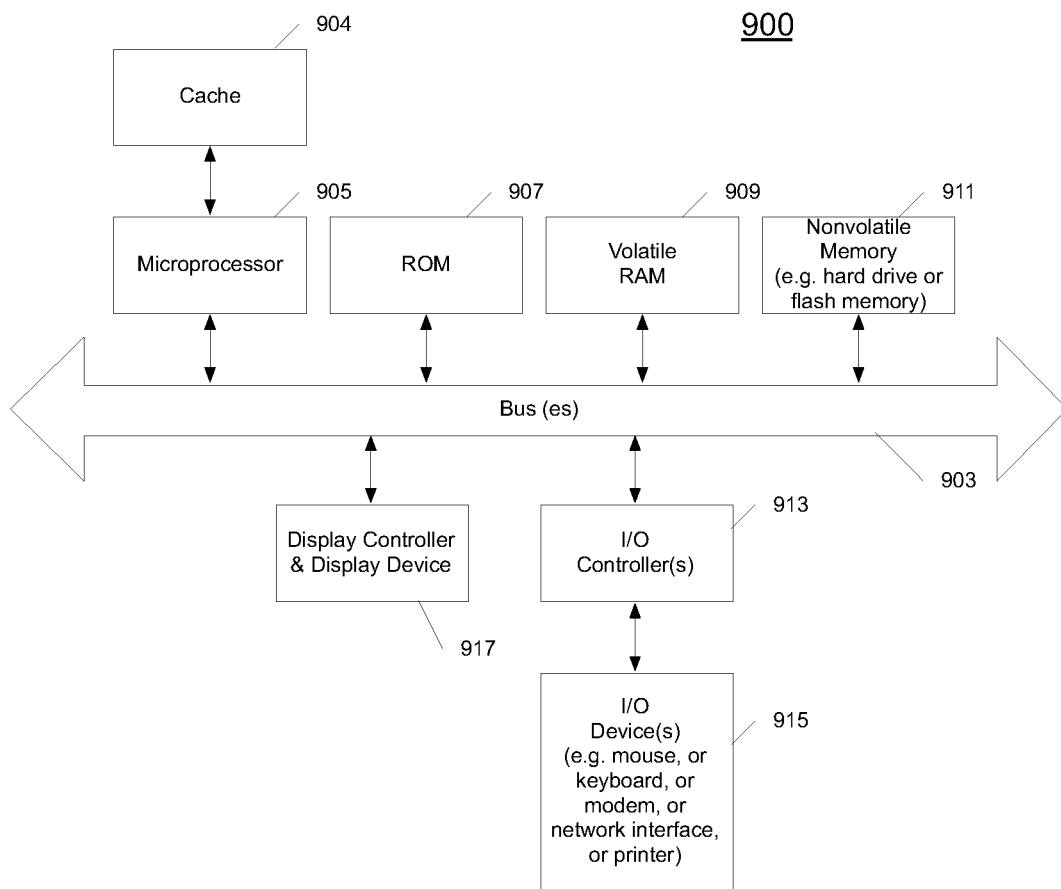
FIG. 9 illustrates one example of a typical computer system, which may be used in conjunction with the embodiments described herein.

FIG. 9 shows one example of a data processing system 900, which may be used with one embodiment of the present invention. For example, the system 900 may be implemented including a network element 100 as shown in FIG. 1. Note that while FIG. 9 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 9, the computer system 900, which is a form of a data processing system, includes a bus 903 which is coupled to a microprocessor(s) 905 and a ROM (Read Only Memory) 907 and volatile RAM 909 and a non-volatile memory 911. The microprocessor 905 may retrieve the instructions from the memories 907, 909, 911 and execute the instructions to perform operations described above. The bus 903 interconnects these various components together and also interconnects these components 905, 907, 909, and 911 to a display controller and display device 917 and to peripheral devices such as input/output (I/O) devices which may be mice, keyboards, modems, network interfaces, printers and other devices which are well known in the art. In one embodiment, the system 900 includes a plurality of network interfaces of the same or different type (e.g., Ethernet copper interface, Ethernet fiber interfaces, wireless, and/or other types of network interfaces). In this embodiment, the system 900 can include a forwarding engine to forward network data received on one interface out another interface.

Typically, the input/output devices 915 are coupled to the system through input/output controllers 913. The volatile RAM (Random Access Memory) 909 is typically implemented as dynamic RAM (DRAM), which requires power continually in order to refresh or maintain the data in the memory.

The mass storage 911 is typically a magnetic hard drive or a magnetic optical drive or an optical drive or a DVD ROM/RAM or a flash memory or other types of memory systems, which maintains data (e.g. large amounts of data) even after power is removed from the system. Typically, the mass storage 911 will also be a random access memory although this is not required. While FIG. 9 shows that the mass storage 911 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 903 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 10:
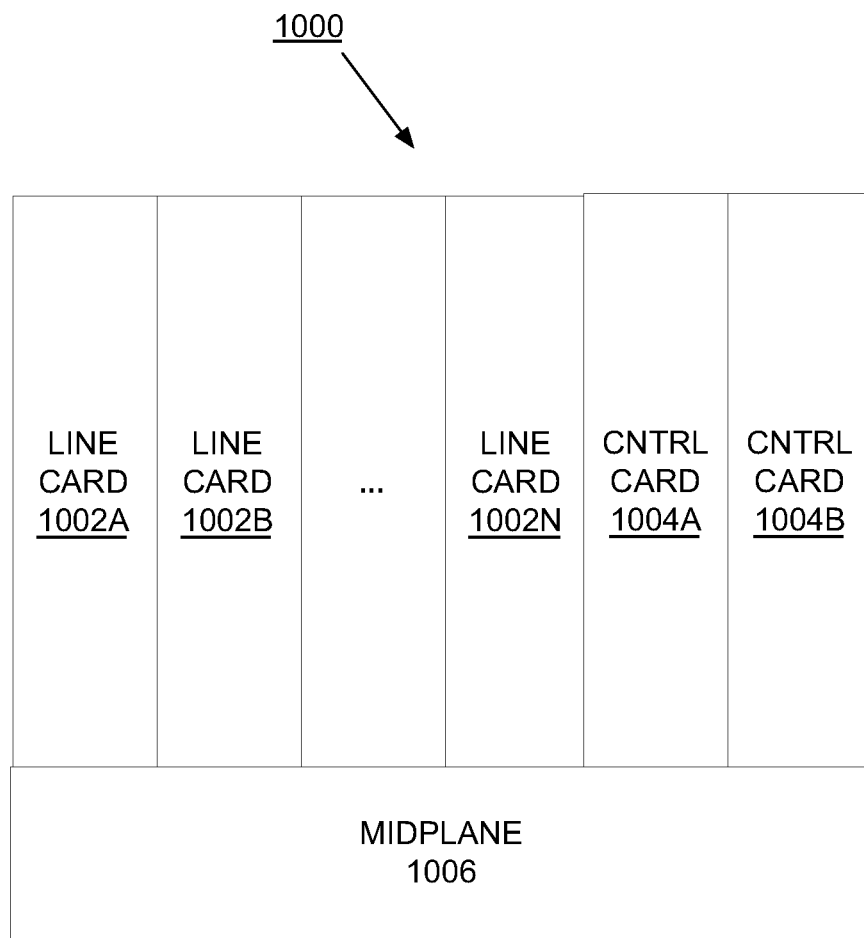
FIG. 10 is a block diagram of one embodiment of an exemplary network element that processes control plane data to the CPU.

FIG. 10 is a block diagram of one embodiment of an exemplary network element 1000 that processes control plane data to the CPU. In FIG. 10, the midplane 1006 couples to the line cards 1002A-N and controller cards 1004A-B. While in one embodiment, the controller cards 1004A-B control the processing of the traffic by the line cards 1002A-N, in alternate embodiments, the controller cards 1004A-B, perform the same and/or different functions (e.g., processes control plane data to the CPU as described in FIGS. 1-4 above). In one embodiment, the line cards 1002A-N process and forward control plane to the controller cards 1004A-B. It should be understood that the architecture of the network element 1000 illustrated in FIG. 10 is exemplary, and different combinations of cards may be used in other embodiments of the invention.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "identifying," "determining," "marking," "queuing," "identifying," "clearing," "processing," "forwarding," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method to process network data in a network element, the method comprising:

receiving, by the network element, network data;

determining a class of the network data;

determining that the determined class of the network data is to be processed;

marking the received network data based on an existence of an indication of whether the network element had previously processed other data in the same class as the determined class of the received network data, wherein the indication is determined at least by computing a function of a subset of network data characteristics of the received network data; and queuing the received network data.

2. The machine-readable medium of claim 1, wherein the indication is whether a group of bits in a group of bitfields are set to a selected value.

3. The machine-readable medium of claim 1, further comprising:

forwarding the marked network data based on at least the marking.

4. The machine-readable medium of claim 1, wherein the determining that the class of network data is to be processed is based on at least a user criterion.

5. The machine-readable medium of claim 1, wherein the received network data is selected from the group consisting of address resolution protocol data, neighbor discovery data, and broadcast data.

6. The machine-readable medium of claim 1, wherein the marking is a high priority mark when there is not the existence of the indication for the determined class.

7. The machine-readable medium of claim 1, wherein the marking is a low priority mark when there is the indication for the determined class.

8. The machine-readable medium of claim 1, wherein the function is a hash function.

9. The machine-readable medium of claim 1, wherein the subset of received network data characteristics is selected based on at least a network data type of the received network data.

10. The machine-readable medium of claim 1, wherein subset of network data characteristics is based on at least user criteria.

11. The machine-readable medium of claim 1, wherein queuing the network data comprises:

selecting at least one of a queue and a queue threshold for the received network data based on at least the existence of the indication.

12. A method to process network data in a network element, the method comprising:

receiving, by the network element, the network data, wherein network data is data that is processed by the network element;

determining a class of the received network data;

determining that the determined class of the received network data is to be processed;

marking the received network data based on an existence of an indication of whether the network element had previously processed other data in the same class as the determined class of the received network data, wherein the indication is determined at least by computing a function of a subset of network data characteristics of the received network data; and queuing the received network data.

13. The method of claim 12, wherein the indication is whether a group of bits in a group of bitfields are set to a selected value.

14. The method of claim 12, further comprising:

forwarding the marked network data based on at least the marking.

15. The method of claim 12, wherein the determining that the class of network data is to be processed is based on at least a user criterion.

16. The method of claim 12, wherein the received network data is selected from the group consisting of address resolution protocol data, neighbor discovery data, and broadcast data.

17. The method of claim 12, wherein the marking is a high priority mark when there is not the existence of the indication for the determined class.

18. The method of claim 12, wherein the marking is a low priority mark when there is the indication for the determined class.

19. A network element to process network data, the network element comprising:

a port;

a data plane, coupled to the port, to receive network data via the port; and a control plane, coupled to the data plane, that includes, memory that stores instructions that when executed by the network element causes the control plane to receive the network data from the data plane, determine a class of the network data, determine that this class of the received network data is to be processed, mark the network data based on an existence of an indication of whether the network element had previously processed other data in the same class as the determined class of the received network data, wherein the indication is determined at least by computing a function of a subset of network data characteristics of the received network data, and queue the received network data.

* * * * *